United States Patent
Baba et al.

(10) Patent No.: US 9,899,897 B2
(45) Date of Patent: Feb. 20, 2018

(54) PERMANENT MAGNET BURIED TYPE ELECTRIC MOTOR AND COMPRESSOR

(71) Applicants: Kazuhiko Baba, Tokyo (JP); Masahiro Nigo, Tokyo (JP); Kazuchika Tsuchida, Tokyo (JP)

(72) Inventors: Kazuhiko Baba, Tokyo (JP); Masahiro Nigo, Tokyo (JP); Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 224 days.

(21) Appl. No.: 14/650,326

(22) PCT Filed: Dec. 21, 2012

(86) PCT No.: PCT/JP2012/083275
§ 371 (c)(1),
(2) Date: Jun. 8, 2015

(87) PCT Pub. No.: WO2014/097472
PCT Pub. Date: Jun. 26, 2014

(65) Prior Publication Data
US 2015/0318764 A1 Nov. 5, 2015

(51) Int. Cl.
*H02K 9/00* (2006.01)
*H02K 9/19* (2006.01)
(Continued)

(52) U.S. Cl.
CPC ............ *H02K 9/19* (2013.01); *F04C 23/008* (2013.01); *F04C 29/0085* (2013.01);
(Continued)

(58) Field of Classification Search
USPC ........................................................ 310/54
See application file for complete search history.

(56) References Cited

U.S. PATENT DOCUMENTS

| 3,971,963 A * | 7/1976 | Koike | ..................... G03B 9/02 310/154.06 |
| 2005/0140235 A1 | 6/2005 | Yamagishi et al. | |

(Continued)

FOREIGN PATENT DOCUMENTS

| CN | 201219227 Y | 4/2009 |
| CN | 101584099 A | 11/2009 |

(Continued)

OTHER PUBLICATIONS

International Search Report of the International Searching Authority dated Feb. 19, 2013 for the corresponding international application No. PCT/JP2012/083275 (and English translation).

(Continued)

*Primary Examiner* — Forrest M Phillips
(74) *Attorney, Agent, or Firm* — Posz Law Group, PLC

(57) ABSTRACT

A permanent magnet buried type electric motor includes a rotator having a rotator core and a stator. The rotator core includes: a plurality of magnet accommodating holes formed as many as the number of poles; a plurality of permanent magnets; air holes through which a coolant and a refrigerant oil pass; and a fastening hole. The magnet accommodating hole is formed into a shape that projects toward a radially inner side and is recessed toward a radially outer side. The air hole portions and the fastening holes are arranged so as to be alternately positioned. The air hole portion is formed into such a shape that includes a portion extending in an arc shape along an outer peripheral surface of a rotary shaft in a circumferential direction of the rotator core so that an area of the air hole portion is larger than an area of the fastening hole.

7 Claims, 6 Drawing Sheets

(51) Int. Cl.
  *H02K 9/02* (2006.01)
  *H02K 1/27* (2006.01)
  *F04D 25/06* (2006.01)
  *F04C 23/00* (2006.01)
  *F04C 29/00* (2006.01)
  *H02K 1/32* (2006.01)
  *H02K 7/14* (2006.01)
  *F04C 18/356* (2006.01)

(52) U.S. Cl.
  CPC ........... *F04D 25/06* (2013.01); *H02K 1/2706* (2013.01); *H02K 1/2766* (2013.01); *H02K 1/32* (2013.01); *H02K 7/14* (2013.01); *H02K 9/02* (2013.01); *F04C 18/356* (2013.01); *F04C 2210/263* (2013.01); *H02K 2201/03* (2013.01)

(56) References Cited

U.S. PATENT DOCUMENTS

| | | |
|---|---|---|
| 2010/0061868 A1 | 3/2010 | Kojima |
| 2012/0104884 A1* | 5/2012 | Wagner ............... H02K 1/32 310/54 |
| 2015/0207378 A1* | 7/2015 | Buttner ............... H02K 5/20 310/54 |
| 2015/0280525 A1* | 10/2015 | Rippel ............... H02K 9/19 310/54 |
| 2015/0280536 A1* | 10/2015 | Vollmer ............... H02K 21/40 310/54 |

FOREIGN PATENT DOCUMENTS

| | | |
|---|---|---|
| CN | 202309280 U | 7/2012 |
| JP | H06-339240 A | 12/1994 |
| JP | 2001-186701 A | 7/2001 |
| JP | 2005-192365 A | 7/2005 |
| JP | 2006-320200 A | 11/2006 |
| JP | 2007-104888 A | 4/2007 |
| JP | 2008-206358 A | 9/2008 |

OTHER PUBLICATIONS

Office Action dated Oct. 10, 2016 issued in corresponding CN patent application No. 201280077829.0 (and English translation).

* cited by examiner

PERMANENT MAGNET BURIED TYPE ELECTRIC MOTOR AND COMPRESSOR

CROSS REFERENCE TO RELATED APPLICATION

This application is a U.S. national stage application of PCT/JP2012/083275 filed on Dec. 21, 2012, the content of which is incorporated herein by reference.

TECHNICAL FIELD

The present invention relates to a permanent magnet motor of a permanent magnet embedded type in which permanent magnets are embedded inside a rotator core, and to a compressor.

BACKGROUND ART

In recent years, due to increase in awareness of energy saving, there have been proposed a large number of permanent magnet motors configured to use rare-earth permanent magnets having high coercivity in a rotator, to thereby realize high efficiency. However, the rare-earth permanent magnets are expensive, which leads to increase in cost of the electric motor. Therefore, in a rotator of a related-art general permanent magnet buried type electric motor, sintered ferrite magnets are used instead of the rare-earth permanent magnets. When the sintered ferrite magnets are used instead of the rare-earth permanent magnets as described above, the residual flux density, which represents the magnitude of the magnetic force, is reduced to about 1/3. In order to compensate for the lack of torque due to the reduction in magnetic force, it is necessary to form the permanent magnets into such shapes that surface areas thereof are increased as much as possible, thereby compensating for the lack of the magnetic force by the surface areas. Further, reluctance torque is actively used in addition to the torque caused by the permanent magnets. In this manner, the lack of the magnetic force due to the permanent magnets can be compensated for.

For example, the rotator of the permanent magnet buried type electric motor disclosed in Patent Literature 1 includes arc-shaped permanent magnets, a laminated core having punched holes for accommodating the permanent magnets therein, and a shaft. The punched holes are formed at a rate of one per pole. Further, the punched hole is formed into an arc shape that protrudes toward the rotator center.

CITATION LIST

Patent Literature

[PTL 1] JP 06-339420 (FIG. 1 etc.)

SUMMARY OF INVENTION

Technical Problem

However, when the permanent magnet buried type electric motor disclosed in Patent Literature 1 is built in a compressor, a sufficient path for a coolant cannot be secured and the performance of the compressor is thus degraded. Moreover, there is a problem in that the coolant and a refrigerant oil are hardly separated from each other and the refrigerant oil often flows out of an airtight container accordingly, which leads to running out of the oil in the compressor.

The present invention has been made in view of the foregoing and has an object to provide a permanent magnet buried type electric motor capable of securing an appropriate magnetic force even when a sintered ferrite magnet is used, and, even when the permanent magnet buried type electric motor is built in a compressor, securing a sufficient path for a coolant and promoting the separation between the coolant and a refrigerant oil.

Solution to Problem

In order to attain the above-mentioned object, according to one embodiment of the present invention, there is provided a permanent magnet buried type electric motor, including: a rotator including a rotator core including a plurality of laminated constituent sheets; and a stator arranged so as to surround the rotator, the rotator core including: a plurality of magnet accommodating holes formed as many as a number of poles along a circumferential direction; a plurality of permanent magnets accommodated in the plurality of magnet accommodating holes; air hole portions serving as paths for allowing a coolant and a refrigerant oil to pass therethrough; and fastening holes for fastening the plurality of laminated constituent sheets, each of the plurality of magnet accommodating holes being formed into a shape that projects toward a radially inner side of the rotator core and is recessed toward a radially outer side thereof, the plurality of air hole portions and the plurality of fastening holes being arranged in the circumferential direction of the rotator core so as to be alternately positioned, the air hole portion being formed into such a shape that includes a portion extending in an arc shape along an outer peripheral surface of the rotary shaft in the circumferential direction of the rotator core so that an area of the air hole portion is larger than an area of the fastening hole.

Advantageous Effects of Invention

According to the one embodiment of the present invention, there is attained an effect of securing the sufficient path for the coolant while securing the appropriate magnetic force even when the sintered ferrite magnet is used, and promoting the separation between the coolant and the refrigerant oil, to thereby provide a high-performance compressor.

DESCRIPTION OF EMBODIMENTS

Figure 1:
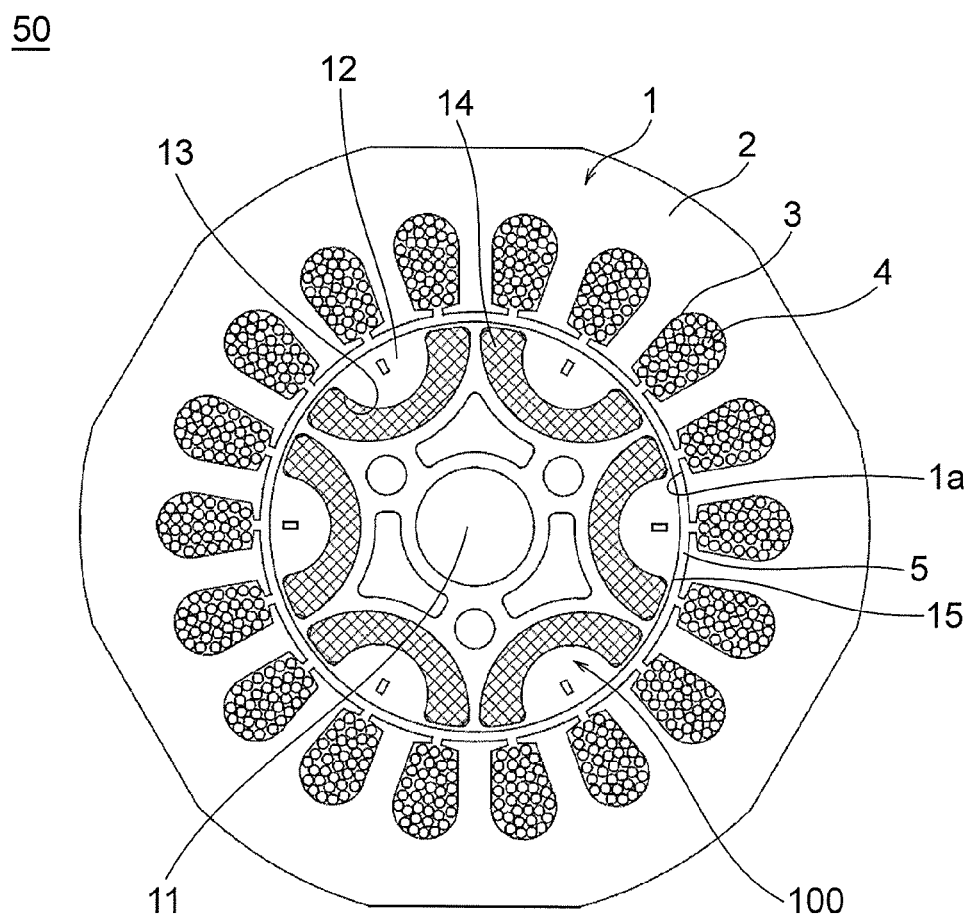
FIG. 1 is a sectional view of a permanent magnet buried type electric motor according to a first embodiment of the present invention.

Now, a permanent magnet buried type electric motor according to embodiments of the present invention is described with reference to the accompanying drawings.

Note that, in the drawings, the same reference symbols represent the same or corresponding parts.

First Embodiment

Figure 2:
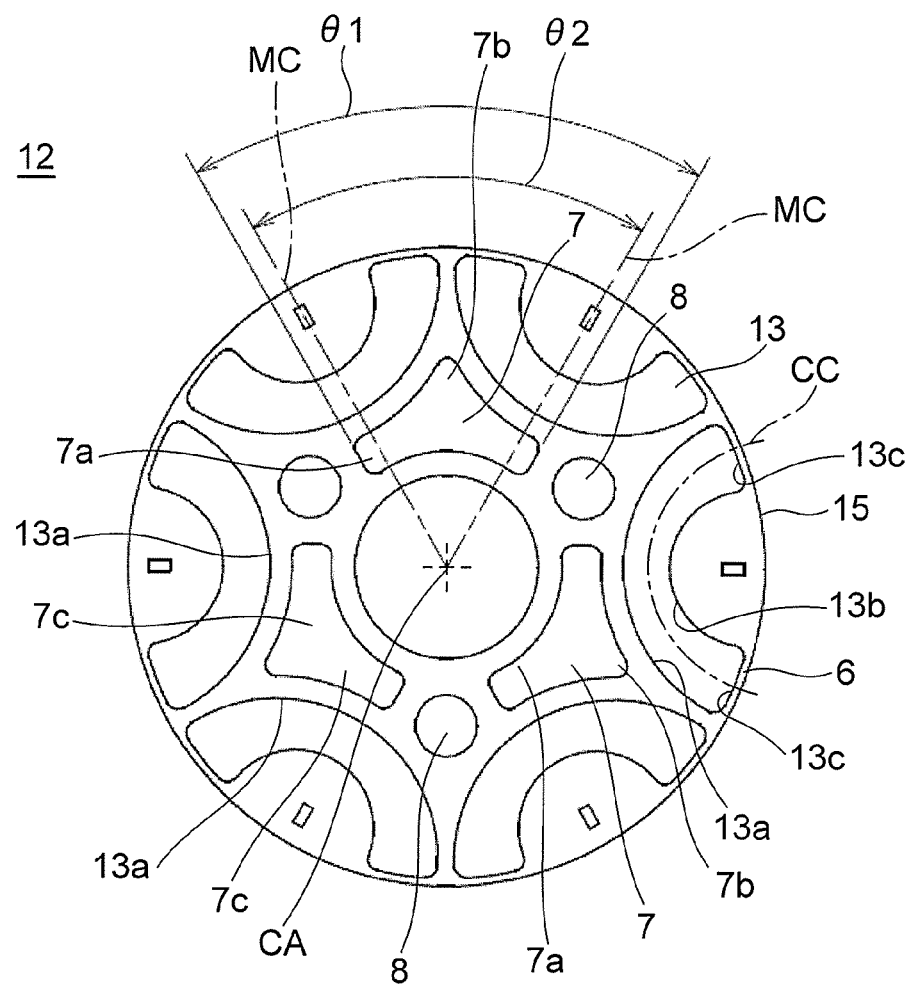
FIG. 2 is a sectional view of a rotator core illustrated in FIG. 1.
Figure 3:
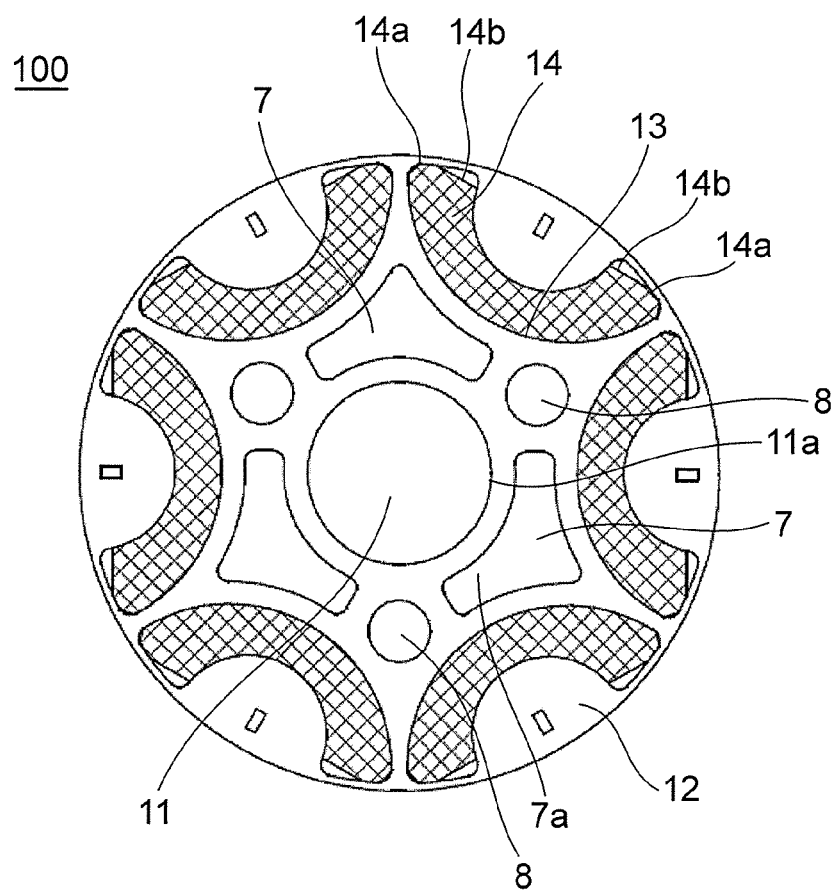
FIG. 3 is a sectional view of a state in which a ferrite magnet is accommodated in the rotator core of FIG. 2.

FIG. 1 is a sectional view of a permanent magnet buried type electric motor according to a first embodiment of the present invention, FIG. 2 is a sectional view for illustrating a rotator core illustrated in FIG. 1, and FIG. 3 is a sectional view of a state in which a ferrite magnet is accommodated in the rotator core of FIG. 2. Note that, in FIG. 1 to FIG. 3, a plane perpendicular to a rotary shaft of a rotator described later corresponds to a surface of the drawing sheet.

In FIG. 1, a permanent magnet buried type electric motor 50 according to the first embodiment of the present invention includes an annular stator 1 and a rotator 100. The stator 1 includes a stator core 2 having an annular shape, a plurality of slots 3 formed at equiangular pitches in a circumferential direction (rotational direction of the rotator 100) in an inner peripheral portion of the stator core 2, and a coil 4 accommodated in each of the slots 3.

On the inner peripheral side of the stator 1, the rotator 100 is arranged so as to be rotatable, and a cylindrical air gap 5 is formed between an outer peripheral surface 15 of the rotator 100 (rotator core 12) and an inner peripheral surface 1a of the stator 1. Note that, the stator 1 illustrated in FIG. 1 is a distributed winding stator as an example, but may be a concentrated winding stator.

Meanwhile, the rotator 100 includes, as a main configuration thereof, the rotator core 12, a rotary shaft 11, and a plurality of permanent magnets 14. Rotational energy is transmitted to the rotary shaft 11 from a drive source, and the rotator core 12 arranged around the periphery of the rotary shaft 11 is rotated with the rotational energy. The rotator core 12 and the rotary shaft 11 are coupled to each other by, for example, shrink fitting or press fitting.

Further, the details of the rotator are described with reference to FIG. 2. FIG. 2 is an illustration of the rotator core 12 before the permanent magnet 14 is accommodated therein. The rotator core 12 is manufactured by laminating, in an extending direction of the rotary shaft 11 (the front-back direction of the drawing sheet of FIG. 2), a plurality of silicon steel sheets (constituent sheets) each punched out into a predetermined shape with a die. The outer peripheral surface 15 of the rotator core 12 is formed into a cylindrical shape.

In the rotator core 12, six magnet accommodating holes 13 are formed along the circumferential direction in a concyclic manner. Each of the magnet accommodating holes 13 is formed into a shape that projects toward a radially inner side of the rotator core 12 and is recessed toward a radially outer side thereof in FIG. 1 to FIG. 3. As an example, specifically, each of the magnet accommodating holes 13 is formed into a substantially U-shape (an inner defining line and an outer defining line are both in an arc shape) in FIG. 1 to FIG. 3. Moreover, each of the magnet accommodating holes 13 is arranged in such a manner that the recessed portion side of the above-mentioned U-shape faces an outer side of the rotator.

More specifically, in the drawing sheet of FIG. 2, each of the magnet accommodating holes 13 has an arc-shaped inner defining line 13a, an arc-shaped outer defining line 13b, and a pair of end lines 13c that connects an end portion of the inner defining line 13a and an end portion of the outer defining line 13b in the vicinity of the outer peripheral surface 15 of the rotator core 12.

In addition, a thickness of the magnet accommodating hole 13 in a short-side direction thereof (direction orthogonal to a curvature center line CC that connects the middle points of the inner defining line 13a and the outer defining line 13b) is set to be minimum at the magnetic pole center portion and be gradually increased toward the radially outer side of the rotator core 12.

The rotator core 12 includes a thinned outer peripheral core portion 6 between the outer peripheral surface 15 of the rotator core 12 and each of the end lines 13c of each magnet accommodating hole 13.

By forming the rotator core 12 as described above, the magnetic resistance in the vicinity of both end portions (end lines 13c) of the magnet accommodating hole 13 can be increased. With this, the saliency ratio (ratio of the minimum inductance to the maximum inductance) of the rotator core 12 can be increased. Thus, the reluctance torque can be effectively used, and higher torque can be realized.

As illustrated in FIG. 3, each of the magnet accommodating holes 13 accommodates the corresponding permanent magnet 14. That is, the permanent magnets 14 forming magnetic poles of the rotator core 12 are arranged as many as the number of poles in the circumferential direction of the rotator core 12 on the outer peripheral side of the rotator core 12. Moreover, the permanent magnet 14 is a sintered ferrite magnet that has a residual flux density of from about 0.4 T to 0.5 T at normal temperature, and a thickness of the pole center portion of the permanent magnet 14 is set to be eight times as large as a width of the air gap 5 (dimension of the motor in the radial direction) or more.

An outer edge shape of the permanent magnet 14 is substantially similar to an inner edge shape of the magnet accommodating hole 13. Inner side portions 14a of both circumferential end portions (both end portions on the radially outer side) of the permanent magnet 14 are subjected to chamfering 14b as appropriate in order to avoid local partial demagnetization. Further, the respective permanent magnets 14 are magnetized so that the N pole and the S pole are alternately positioned in a radial direction of the rotator 100. Specifically, the permanent magnet 14 is magnetized in a radially oriented manner so that a focal point of the orientation of the permanent magnet 14 is positioned outside of the rotator 100 on the center line passing through the center CA of the rotator 100 and the center portion of magnetic poles of the permanent magnet 14.

The sintered ferrite magnet has a larger electric resistance as compared to an Nd—Fe—B based sintered rare-earth permanent magnet. Therefore, an eddy current loss is less liable to flow, but the coercivity is extremely small (about ⅓ of that of the sintered rare-earth permanent magnet), and demagnetization is easily caused when the demagnetizing field is applied. On the other hand, the magnetic resistance increases toward the center side of the core when no magnet accommodating hole is formed. Therefore, the thickness of the magnet accommodating hole in the short-side direction is set to be minimum on the core center side (pole center portion) and be increased toward the radially outer side of the core. In this manner, the imbalance of the magnetic resistance can be resolved, and the demagnetizing field can be prevented from concentrating on the vicinity of the end portions of the permanent magnet.

A magnetic force of the permanent magnet can be effectively secured with the arrangement of the permanent magnets in this way. Moreover, demagnetization resistance of the both end portions of the permanent magnet can be improved.

In a portion of the rotator core 12 between the rotary shaft 11 and the magnet accommodating holes 13, there are formed a plurality of air hole portions 7 serving as paths for allowing the coolant and the refrigerant oil to pass therethrough, and a plurality of fastening holes 8 having the shape of a true circle, for fastening the plurality of silicon steel sheets laminated to form the rotator core 12.

The air hole portions 7 as many as half the number of poles are formed along the rotary shaft 11. Each of the air hole portions 7 is formed in a corresponding interpole portion. Moreover, the air hole portions 7 and the fastening holes 8 are arranged in the circumferential direction of the rotator core 12 so as to be alternately positioned. Specifically, the number of poles is six in the first embodiment, and hence the number of the air hole portions 7 is three and the number of the fastening holes 8 is also three. In addition, the arrangement mode of the air hole portions 7 and the fastening holes 8 is symmetry in each interpole portion.

Moreover, the air hole portion 7 is formed, by design, into such a shape that includes a portion 7a extending in an arc shape along a cylindrical outer peripheral surface 11a of the rotary shaft 11 in the circumferential direction of the rotator core 12, so that an area of the air hole portion 7 is larger than an area of the fastening hole 8.

In this case, as illustrated in FIG. 2, when a spread angle of the air hole portion 7 in the circumferential direction is represented by $\theta 1$ and a pitch of a corresponding pair of magnetic poles is represented by $\theta 2$, $\theta 1 \geq \theta 2$ is established. In other words, when a pair of magnetic pole center lines MC with respect to a pair of magnetic poles is assumed, which is defined by a radius relating to the center CA of the rotator core 12, the air hole portion 7 includes a portion extending to a region on a circumferentially outer side of the corresponding pair of magnetic pole center lines MC.

Moreover, the air hole portion 7 is formed into such a shape that includes a protruding portion 7b toward the radially outer side of the rotator core 12. In addition, the air hole portion 7 is formed into such a shape that includes a portion 7c extending along the inner defining line 13a of the magnet accommodating hole 13 in the circumferential direction of the rotator core 12.

With the arrangement of the air hole portions 7 in this way, the path for the coolant can be sufficiently secured while securing the strength of the rotor and an appropriate magnetic force. Moreover, the separation between the coolant and the refrigerant oil can be promoted. Consequently, there is such an effect that a reduction in heat conductive performance caused when the refrigerant oil is mixed into the coolant to be circulated in a refrigeration cycle can be suppressed, and hence a high-performance compressor can be provided.

Second Embodiment

Next, a permanent magnet buried type electric motor according to a second embodiment of the present invention is described. In the first embodiment described above, one air hole portion including one space is formed between the pair of magnet accommodating holes, but the present invention is not limited thereto. A plurality of divided spaces formed between the pair of magnet accommodating holes may function as one air hole portion. The second embodiment is an example of a case where one air hole portion includes a plurality of (two in FIG. 4) space portions divided in the circumferential direction.

Figure 4:
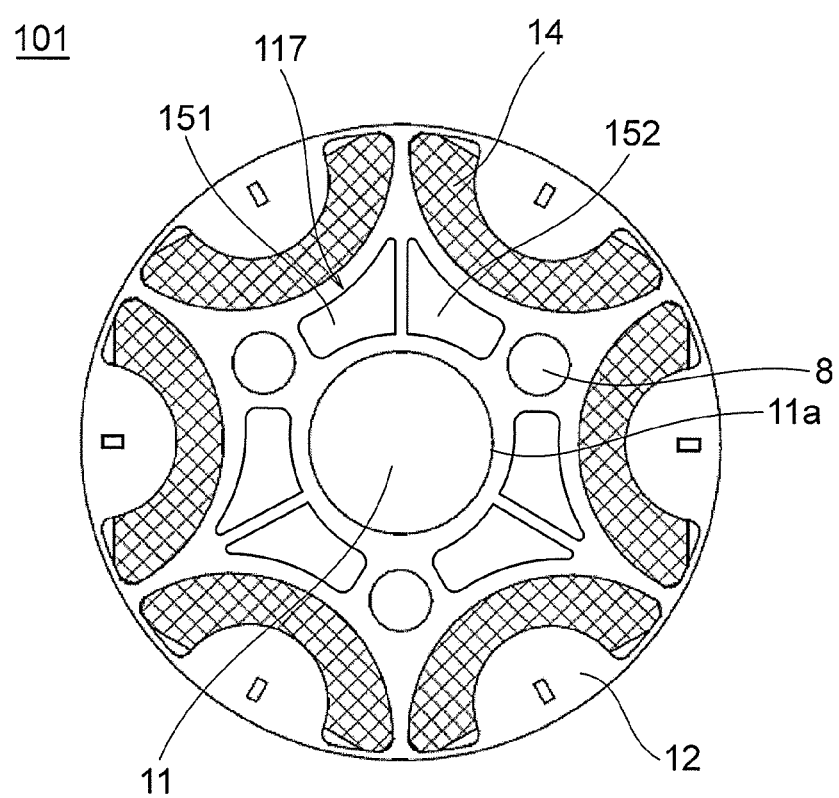
FIG. 4 is a view in the same mode as FIG. 3 according to a second embodiment of the present invention.

FIG. 4 is a view in the same mode as FIG. 3 according to the second embodiment. The second embodiment is similar to the above-mentioned first embodiment except for parts described below. As illustrated in FIG. 4, in a rotator 101, one air hole portion 117 includes two space portions 151 and 152 divided into two parts in the vicinity of the interpole portion in the circumferential direction. When the two space portions 151 and 152 are macroscopically seen, the air hole portion 117 occupies a similar range to the air hole portion 7 of the above-mentioned first embodiment, and is formed to include a portion extending in an arc shape along the cylindrical outer peripheral surface 11a of the rotary shaft 11 in the circumferential direction of the rotator core 12.

Also in the second embodiment as described above, an advantage similar to that of the above-mentioned first embodiment can be obtained. Accordingly, even when a sintered ferrite magnet is used, the path for the coolant can be sufficiently secured while securing the appropriate magnetic force, and the separation between the coolant and the refrigerant oil can be promoted, with the result that the high-performance compressor can be provided. In addition, according to the second embodiment, the air hole portion is formed in a divided manner, and hence the strength of the rotator is further increased, to thereby allow the rotation at higher speed and achieve a higher output. Moreover, in a case where an attempt is made to increase the speed, running out of the refrigerant oil generally becomes a problem. However, when the air hole portion includes the divided space portions as in this embodiment, both of promoting the increase in speed and promoting the separation between the coolant and the refrigerant oil can be achieved. Accordingly, there is such a beneficial effect that a reduction in heat conductive performance caused when the refrigerant oil is mixed into the coolant to be circulated in the refrigeration cycle can be suppressed even when the rotation operation is performed at high speed.

Third Embodiment

Next, a permanent magnet buried type electric motor according to a third embodiment of the present invention is described. In the third embodiment, as another example of the case where a plurality of divided spaces function as one air hole portion, an example of a case where one air hole portion includes a plurality of (two in FIG. 5) space portions divided in the radial direction is described.

Figure 5:
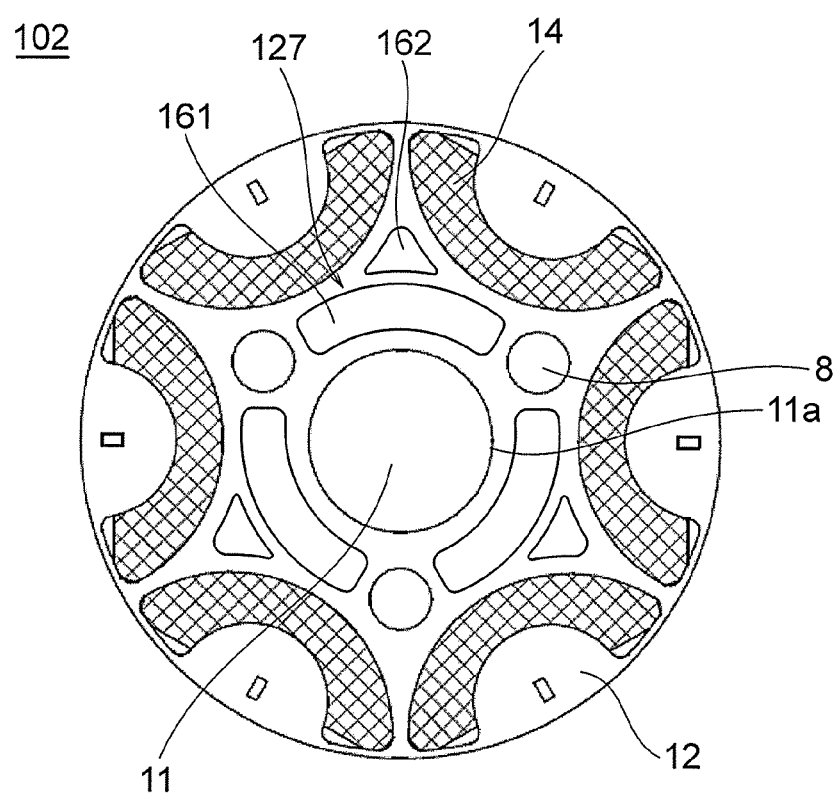
FIG. 5 is a view in the same mode as FIG. 3 according to a third embodiment of the present invention.

FIG. 5 is a view in the same mode as FIG. 3 according to the third embodiment. The third embodiment is also similar to the above-mentioned first embodiment except for parts described below. As illustrated in FIG. 5, in a rotator 102, one air hole portion 127 includes two space portions 161 and 162 divided into two parts in the radial direction. The space portion 161 is an air hole forming portion on the inner diameter side, which is spread in the circumferential direction, and the space portion 162 is an air hole forming portion on the outer diameter side, which protrudes toward the radially outer side. When the two space portions 161 and 162 are macroscopically seen, the air hole portion 127 occupies a similar range to the air hole portion 7 of the above-mentioned first embodiment, and is formed to include a portion extending in an arc shape along the cylindrical outer peripheral surface 11a of the rotary shaft 11 in the circumferential direction of the rotator core 12.

Also in the third embodiment as described above, an advantage similar to that of the above-mentioned second embodiment can be obtained. Accordingly, the path for the coolant can be sufficiently secured while securing the appropriate magnetic force, and the separation between the coolant and the refrigerant oil can be promoted, with the result that the high-performance compressor can be provided. In addition, both of promoting the increase in speed and promoting the separation between the coolant and the refrigerant oil can be achieved. Note that, in the second and third embodiments, the number of divided space portions may be three or more, the dividing direction may be a direction other than the circumferential direction and the radial direction, and dividing modes in different directions may be combined for one air hole portion.

Fourth Embodiment

Figure 6:
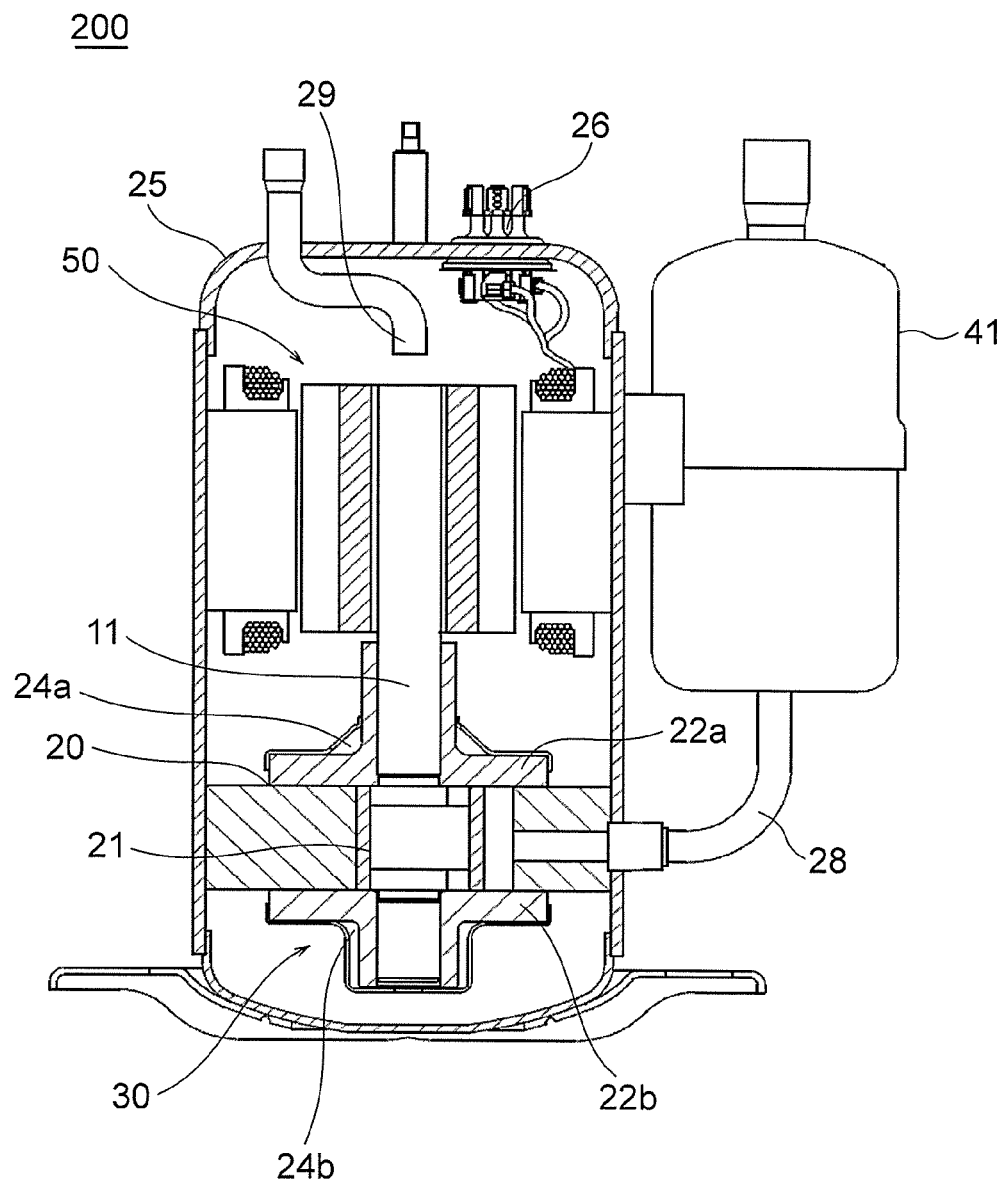
FIG. 6 is a sectional view for illustrating a state in which a motor of the present invention is built in a compressor.

Next, as a fourth embodiment of the present invention, there is described a rotary compressor in which the permanent magnet buried type electric motor according to any one of the above-mentioned first to third embodiments is mounted. Note that, the compressor according to the present invention is not limited to the rotary compressor. FIG. 6 is a vertical sectional view of a cylinder rotary compressor in which the permanent magnet buried type electric motor illustrated in FIG. 1 to FIG. 5 is mounted.

A rotary compressor 200 includes a motor 50 (motor element) and a compression element 30 in an airtight container 25. Although not illustrated, at a bottom portion of the airtight container 25, a refrigerant oil for lubricating each of sliding portions of the compression element 30 is stored.

The compression element 30 includes, as main components thereof, a cylinder 20 arranged in a vertically stacked state, the rotary shaft 11 rotated by the motor, a piston 21 to be fitted by insertion into the rotary shaft 11, a vane (not shown) dividing an inside of the cylinder 20 into an in-take side and a compression side, an upper frame 22a and a lower frame 22b being a pair of upper and lower frames into which the rotary shaft 11 is to be rotatably fitted by insertion, for closing axial end surfaces of the cylinder 20, and mufflers 24a and 24b mounted on the upper frame 22a and the lower frame 22b, respectively.

The stator 1 of the motor 50 is directly fixed to the airtight container 25 by a method such as shrink fitting or welding and is held thereby. The coil 4 of the stator 1 is supplied with power from a glass terminal 26 fixed to the airtight container 25.

The rotator 100 is arranged through intermediation of an air gap secured on the inner diameter side of the stator 1, and is held in a rotatable state by the bearing portions (upper frame 22a and lower frame 22b) of the compression element 30 arranged at the lower part of the rotary compressor 200 via the rotary shaft 11 in the center portion of the rotator 100.

Next, an operation of the rotary compressor is described. A refrigerant gas supplied from an accumulator 41 is taken into the cylinder 20 through an intake pipe 28 fixed to the airtight container 25. The motor 50 is rotated by energization of an inverter so that the piston 21 fitted to the rotary shaft 11 is rotated in the cylinder 20. With this, the coolant is compressed in the cylinder 20. The coolant, which has passed through the mufflers 24a and 24b, passes through the air hole portions of the motor 50 and the like to rise in the airtight container 25. At this time, the refrigerant oil is mixed into the compressed coolant. When the mixture of the coolant and the refrigerant oil passes through the air hole portions 7 formed in the rotator core 12, the coolant and the refrigerant oil are promoted to be separated from each other, and hence the refrigerant oil can be prevented from flowing into a discharge pipe 29. In this manner, the compressed coolant is supplied on a high-pressure side of the refrigeration cycle through the discharge pipe 29 arranged on the airtight container 25.

Note that, as the coolant for the rotary compressor 200, R410A, R407C, R22, or the like has hitherto been used, but any coolant such as a coolant having a low global warming potential (GWP) can also be applied. In view of the prevention of global warming, a low GWP coolant is desirable. As typical examples of the low GWP coolant, the following coolants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is four.

(2) A hydrocarbon having a carbon double bond in the composition; for example, R1270 (propylene) is given. Note that, R1270 has a GWP of three, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure coolant, is large in pressure loss and is thus liable to degrade the performance of the refrigeration cycle (in particular, in an evaporator). Therefore, a mixture of HFO-1234yf and R32 or R41 that is a coolant higher in pressure than HFO-1234yf is positively used in practical.

Also in the rotary compressor according to the fourth embodiment configured as described above, the air hole portions are formed in the motor as described above, and hence such an advantage that the path for the coolant can be sufficiently secured while securing the strength of the rotor and the appropriate magnetic force. Moreover, the separation between the coolant and the refrigerant oil can be promoted. Consequently, there is such an effect that a reduction in heat conductive performance caused when the refrigerant oil is mixed into the coolant to be circulated in the refrigeration cycle can be suppressed so that the high-performance compressor can be provided.

Note that, it is needless to say that the embodiments of the present invention are examples of the details of the present invention, and may be combined with further another publicly known art or may be changed such as partially omitted within a range that does not depart from the gist of the present invention.

REFERENCE SIGNS LIST 1 stator, 5 air gap, 7, 117, 127 air hole portion, 8 fastening hole, 12 rotator core, 13a inner defining line, 13b outer defining line, 13 magnet accommodating hole, 14 permanent magnet, 25 airtight container, 30 compression element, 50 permanent magnet buried type electric motor, 100, 101, 102 rotator, 200 rotary compressor

The invention claimed is:

1. A permanent magnet buried type electric motor, comprising:
   a rotator including a rotator core including a plurality of laminated constituent sheets; and
   a stator arranged so as to surround the rotator,
   the rotator core comprising:
      a plurality of magnet accommodating holes formed as many as a number of poles along a circumferential direction;
      a plurality of permanent magnets accommodated in the plurality of magnet accommodating holes;

air hole portions serving as paths for allowing a coolant and a refrigerant oil to pass therethrough;

fastening holes for fastening the plurality of laminated constituent sheets, each of the plurality of magnet accommodating holes being formed into a shape that projects toward a radially inner side of the rotator core and is recessed toward a radially outer side thereof, each of the plurality of magnet accommodating holes having an inner defining line that projects toward the radially inner side of the rotator core, the plurality of air hole portions and the plurality of fastening holes being arranged on a same radius with respect to the center of the rotator core and in the circumferential direction of the rotator core so as to be alternately positioned, the air hole portion being formed into such a shape that includes a portion extending in an arc shape along an outer peripheral surface of the rotary shaft in the circumferential direction of the rotator core so that an area of the air hole portion is larger than an area of the fastening hole, wherein when a spread angle of the air hole portion in the circumferential direction is represented by $\theta 1$ and a pitch of a corresponding pair of the magnetic poles is represented by $\theta 2$, $\theta 1 \geq \theta 2$ is established, and wherein the air hole portion is formed into such a shape that includes a protruding portion toward the radially outer side of the rotator core, and a portion extending along the inner defining line of the magnet accommodating hole in the circumferential direction of the rotator core.

2. A permanent magnet buried type electric motor according to claim 1, wherein for each of the air hole portions, a distance between both the protruding portion and the portion extending along the inner defining line of the magnetic accommodating holes is kept constant with respect to opposing inner defining lines of the magnetic accommodating holes.

3. A permanent magnet buried type electric motor according to claim 1, wherein a thickness of the magnet accommodating hole in a short-side direction is set to be minimum at a magnetic pole center portion and be gradually increased toward the radially outer side of the rotator core.

4. A permanent magnet buried type electric motor according to claim 1, wherein each of the plurality of air hole portions comprises a plurality of divided space portions.

5. A permanent magnet buried type electric motor according to claim 1, wherein an air gap is secured between the outer peripheral surface of the rotator core and an inner peripheral surface of the stator, and wherein a thickness of a pole center portion of the permanent magnet is set to be eight times as large as a width of the air gap or more.

6. A compressor, comprising a motor and a compression element in an airtight container, the motor comprising the permanent magnet buried type electric motor of claim 1.

7. A permanent magnet buried type electric motor, comprising:

a rotator including a rotator core including a plurality of laminated constituent sheets; and a stator arranged so as to surround the rotator, the rotator core comprising:

a plurality of magnet accommodating holes formed as many as a number of poles along a circumferential direction;

a plurality of permanent magnets accommodated in the plurality of magnet accommodating holes;

air hole portions serving as paths for allowing a coolant and a refrigerant oil to pass therethrough;

fastening holes for fastening the plurality of laminated constituent sheets, each of the plurality of magnet accommodating holes being formed into a shape that projects toward a radially inner side of the rotator core and is recessed toward a radially outer side thereof, the plurality of air hole portions and the plurality of fastening holes being arranged on the same radius with respect to the center of the rotator core and in the circumferential direction of the rotator core so as to be alternately positioned, the air hole portion being formed into such a shape that includes a portion extending in an arc shape along an outer peripheral surface of the rotary shaft in the circumferential direction of the rotator core so that an area of the air hole portion is larger than an area of the fastening hole, wherein when a spread angle of the air hole portion in the circumferential direction is represented by $\theta 1$ and a pitch of a corresponding pair of the magnetic poles is represented by $\theta 2$, $\theta 1 \geq \theta 2$ is established, wherein a thickness of the magnet accommodating hole in a short-side direction is set to be minimum at a magnetic pole center portion and be gradually increased toward the radially outer side of the rotator core, and wherein the permanent magnet comprises a ferrite magnet.

* * * * *